Dec. 24, 1946.  C. A. WIKEN ET AL  2,413,016
CUTTING MACHINE
Filed Oct. 1, 1942  6 Sheets-Sheet 1
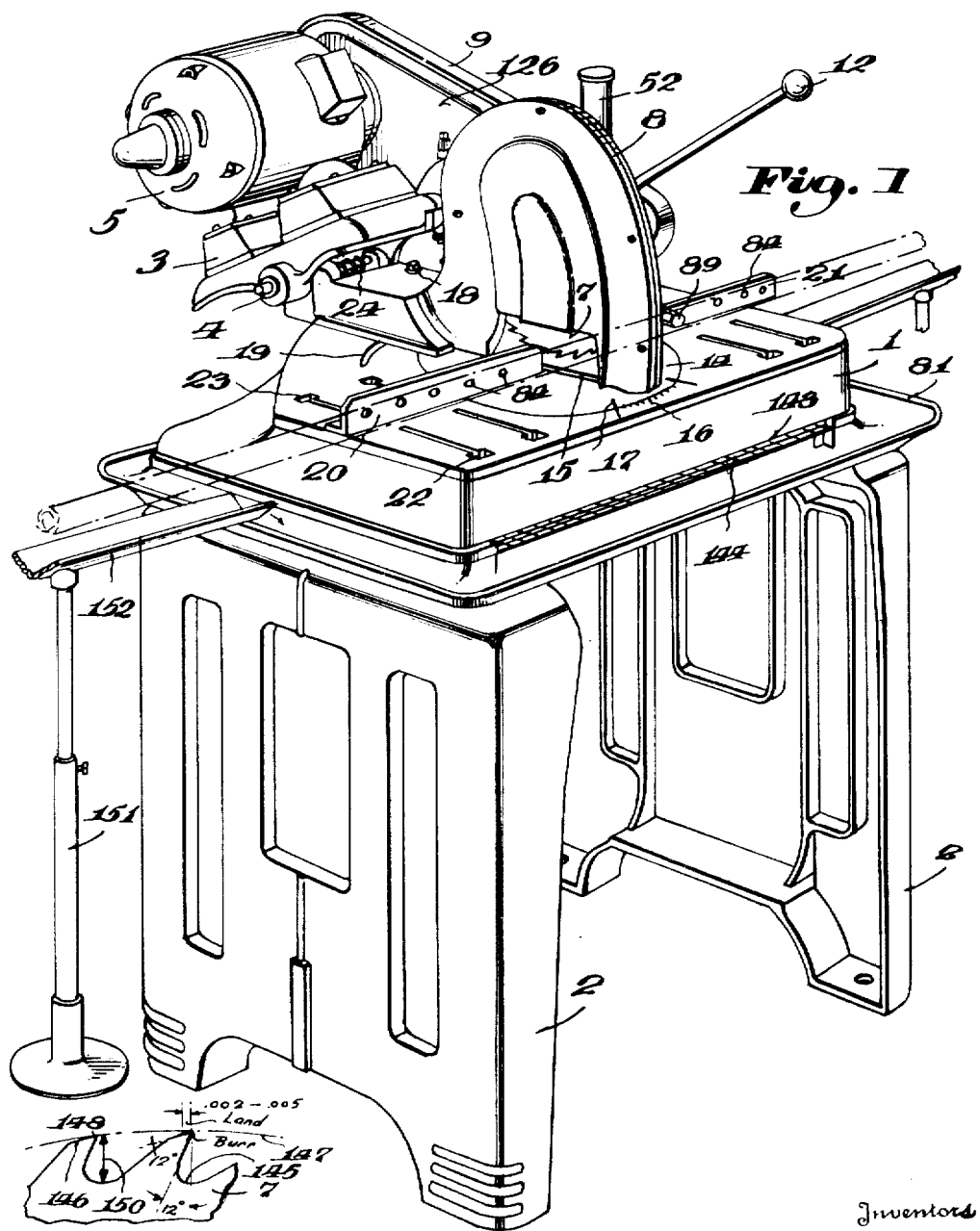
Fig. 1
Fig. 15
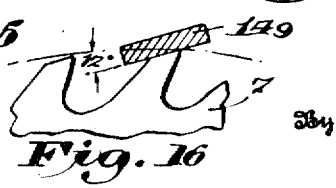
Fig. 16
Inventors
Christy A. Wiken,
Hugo V. Boehnke,
Strauch & Hoffman
Attorneys Dec. 24, 1946.  C. A. WIKEN ET AL  2,413,016
CUTTING MACHINE
Filed Oct. 1, 1942
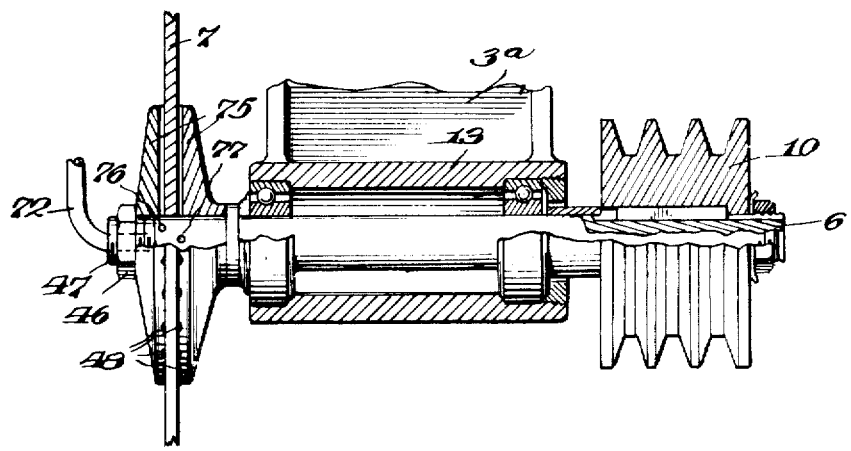
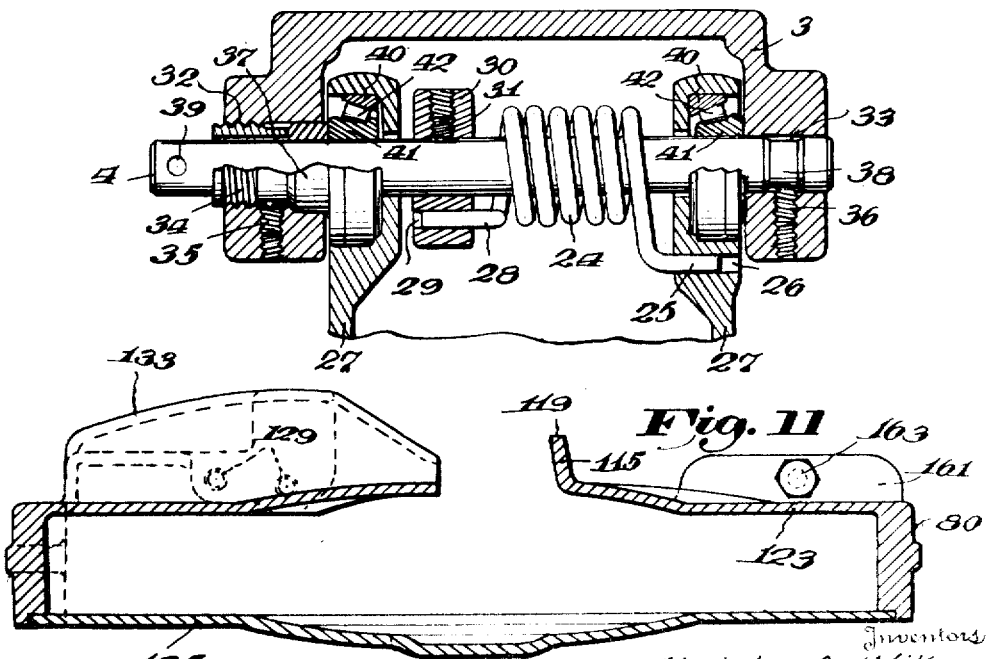
Inventors
Christy A. Wiken,
Hugo V. Boehnke,
By Strauch & Hoffman
Attorneys

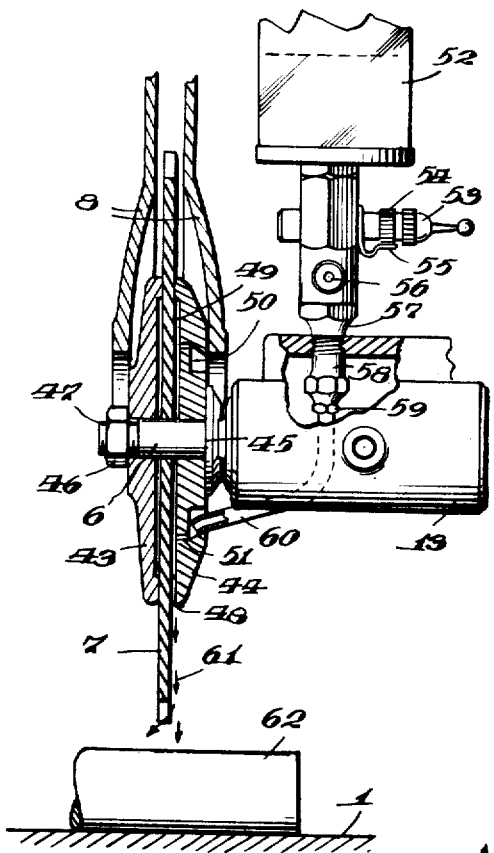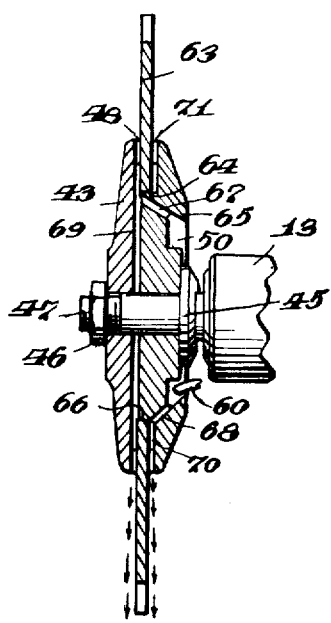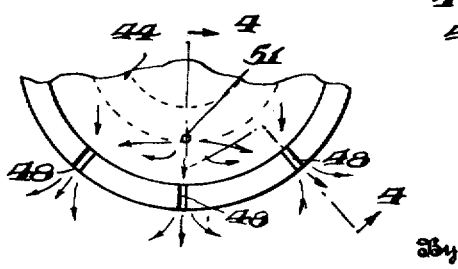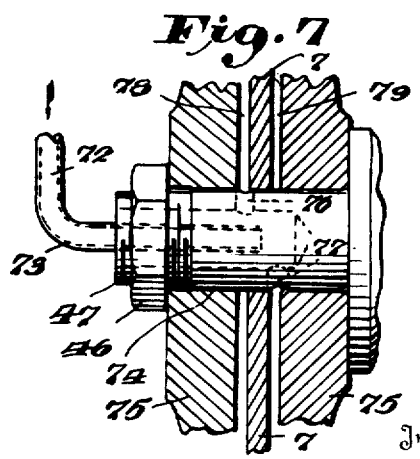

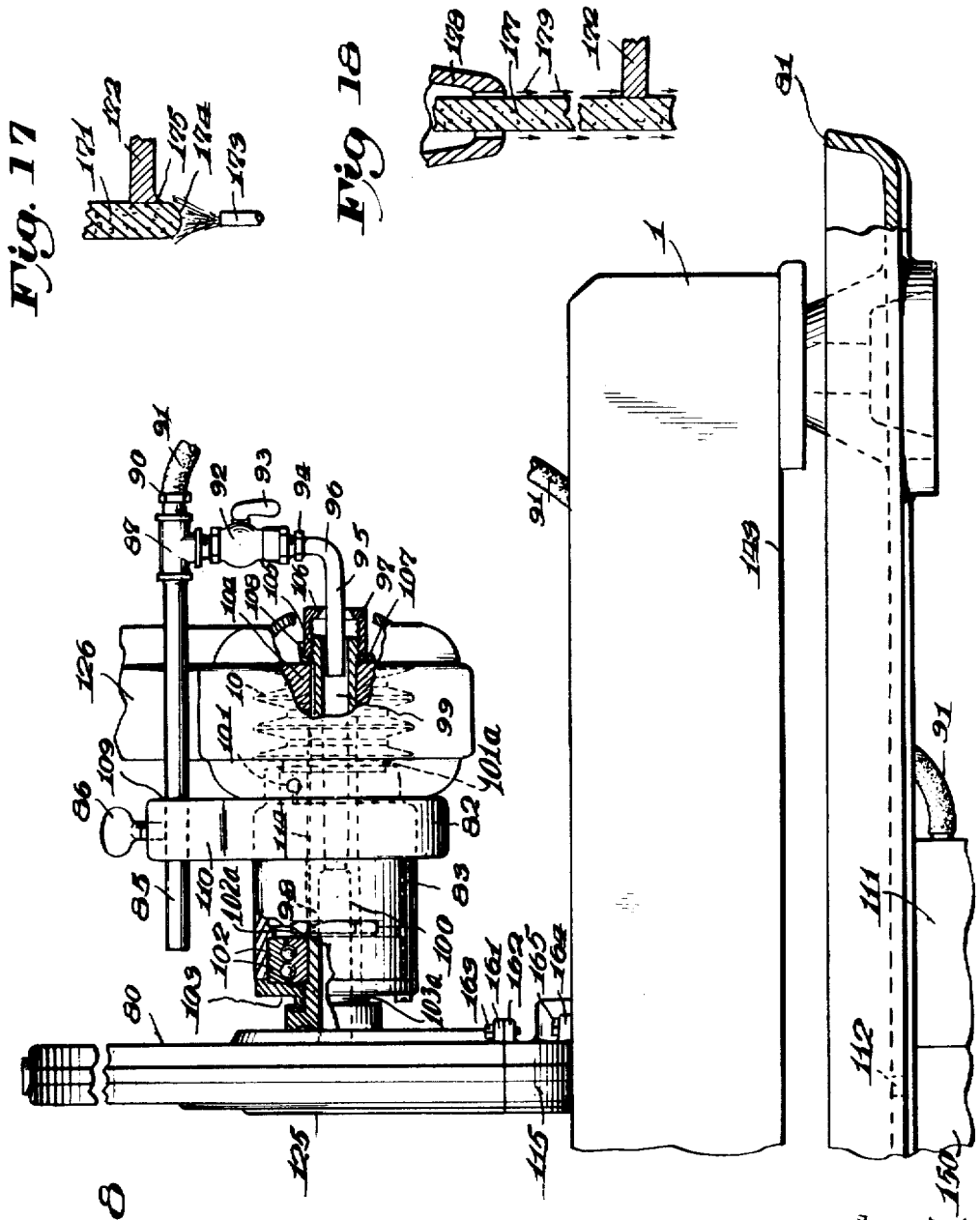

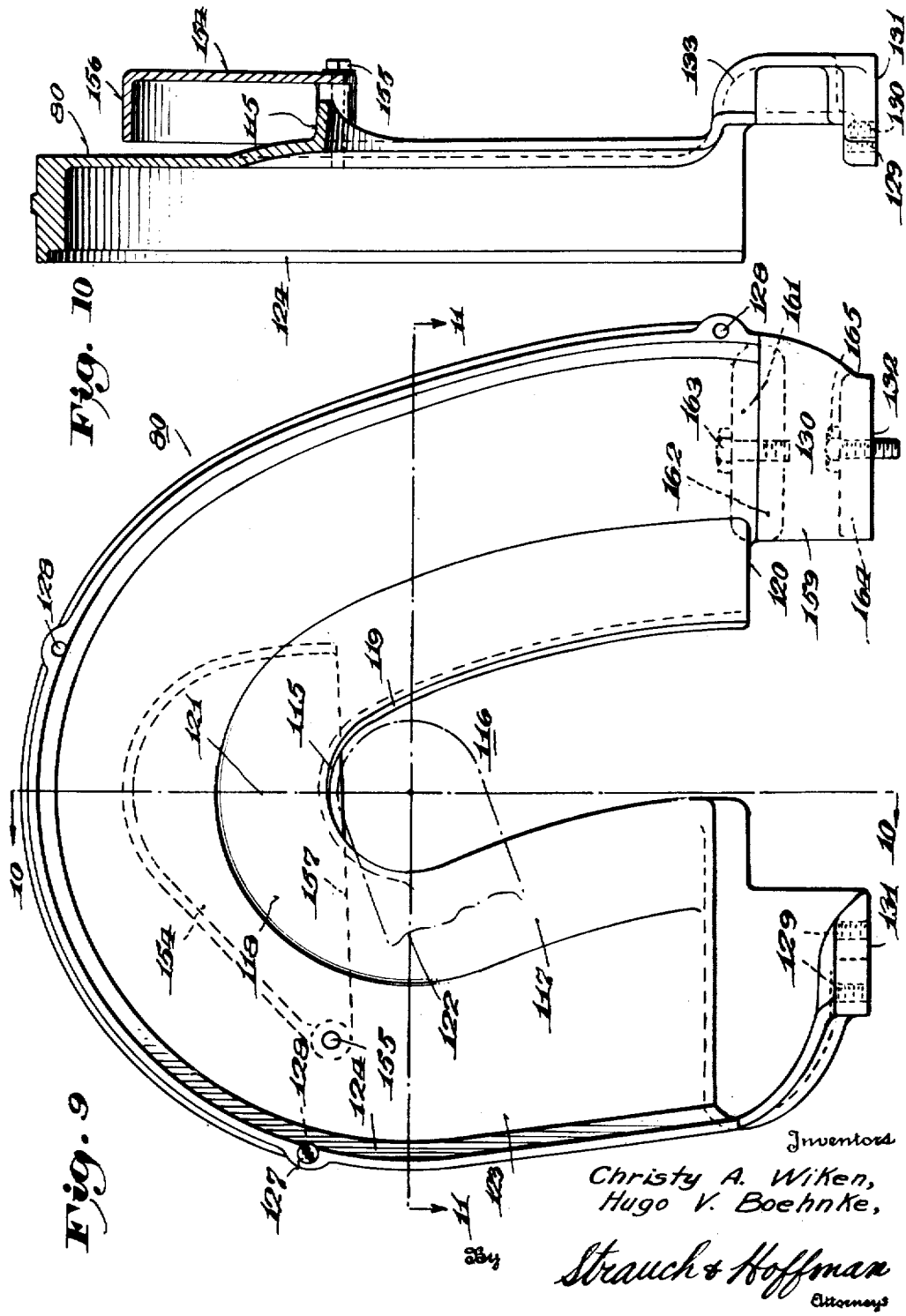

Dec. 24, 1946.　　C. A. WIKEN ET AL　　2,413,016
CUTTING MACHINE
Filed Oct. 1, 1942　　6 Sheets-Sheet 6

Inventors
Christy A. Wiken,
Hugo V. Boehnke
By Strauch & Hoffman
Attorneys

Patented Dec. 24, 1946

2,413,016

UNITED STATES PATENT OFFICE 2,413,016

CUTTING MACHINE

Christy A. Wiken and Hugo V. Boehnke, Milwaukee, Wis., assignors, by mesne assignments, to Rockwell Manufacturing Company, Pittsburgh, Pa., a corporation of Pennsylvania Application October 1, 1942, Serial No. 460,440

3 Claims. (Cl. 29—69)

The present invention relates to cutting machines, and more particularly to machines known in the art as cut-off machines, for transversely cutting elongated, metallic or non-metallic material, although it is not limited to such use.

Rotating cutting machines have been heretofore proposed for cutting non-ferrous metals, such as brass and aluminum, embodying either a slowly revolving saw, or an abrasive wheel. The slow speed saw is open to the objections that a burr is produced on the work, which must be removed in a further operation; heat is developed during cutting which results in rapidly dulling the cutting edges of the saw; and it is impossible to turn out work in large volume production unless a great number of machines and workmen are employed. The abrasive wheels also generate large quantities of heat and produce a burr on the work, and moreover often become "filled" when cutting certain materials, entailing a shut down until the wheel can be cleared.

A parting tool has also been used in a screw machine for severing pipe and bar stock, but here again work can be turned out only in low volume, because it is impossible to exceed cutting speeds of approximately two hundred feet per minute, excessive heat is developed and rapid wear of the cutting edge occurs, notwithstanding the use of a coolant, due to the fact that the tool is constantly disposed in cutting engagement with the work and does not get a rest, except when changing from one work-piece to the next. The use of a parting tool is also extremely wasteful of material, because, for example, in cutting a pipe having a wall thickness of $\frac{3}{32}$ inch, it would have to be at least $\frac{1}{8}$ inch thick to stand up, with the result that it would remove a ring of metal $\frac{1}{8}$ inch thickness for each cut of the work-piece.

We have found that by feeding a coolant closely adjacent to the axis of a rotating cutter, in a region of relatively low speed and negligible windage, to one or both sides of the cutter, the coolant may be caused to closely hug, and pass outwardly over, the face of the cutter to the periphery in a substantially uniform film, effecting a much superior cooling action than has been heretofore attainable, and making possible the production of accurate burr-free work.

We have discovered that when the coolant distributing device of the invention is applied to a circular saw, and by employing a comparatively thin metal saw blade, having teeth of special form and gullets sufficiently large to receive the whole chip removed during each cut; and made of a steel of sufficient hardness to avoid rapid dulling of the teeth, and yet sufficiently ductile and tough enough to withstand the stresses of sawing without cracking, and sufficiently soft to permit sharpening of the teeth by filing; rotating the saw so as to produce cutting speeds of from five to fifteen thousand feet per minute; constantly feeding a coolant to one or both sides of the blade and distributing it so as to constantly abstract heat from the cutting teeth; and moving the saw and work relatively in a direction exactly in the plane of the saw, it is possible to produce burr-free work materially faster than heretofore possible, without overheating the saw or the work and without requiring re-sharpening of the saw until after a great volume of work has been turned out.

We have also found that when the coolant distributing device of the invention is applied to a rapidly rotating abrasive wheel, and comparatively large volumes of coolant are fed outwardly over the sides of the wheel during the cutting operation, so as to keep the temperature of the wheel the same on both sides, the wheel may be used to turn out work more rapidly than heretofore possible, without danger of the wheel undergoing thermally induced distortion, and also, due to efficient cooling of the sides of the wheel, and lack of cooling at the center of the cutting face, the wheel will develop a concave cutting face and make possible the production of absolutely burr-free work.

This application is a continuation-in-part of our co-pending application Serial No. 403,048, filed July 18, 1941, and now Patent No. 2,372,699 granted April 3, 1945, for "Cutting machines," in which is disclosed certain forms of the coolant distributing means and certain other features which in part contribute to the success of the present invention.

It is the major object of this invention to provide novel cutting methods, and apparatus for carrying them out, which make possible the production of work-pieces more rapidly than heretofore possible, without excessively heating the cutting device or the work, and with greatly improved accuracy and absolute freedom from burrs or other imperfections.

A further object is to provide a novel apparatus for sawing metallic or other materials and embodying a circular saw of special tooth form and material; means for continuously supplying coolant to the cutting edge during operation; and means for rotating the saw at high speed, which will cut faster and more accurately than heretofore feasible, and yet will not excessively heat the saw or the work-piece nor produce burrs or other imperfections on the work.

A further object is to provide a rotatable cutter with means for constantly feeding a supply of liquid coolant outwardly from a region closely adjacent the axis of cutter rotation in an area of negligible windage, to one or both sides of the cutter, so as to cause it to closely hug the surface of, and travel out over, the cutter to the periphery without interference from windage.

Another object is to provide a novel method of forming and sharpening the teeth of a circular saw blade, which will enable the blade to cut non-ferrous metals and other materials accurately and at high speed, without excessive heating or producing burrs on the work, and which also makes it possible to cut a maximum number of work-pieces before requiring re-sharpening.

Another object is to provide a cutting machine having a rotating cutter carried by a movable frame, with means for journalling the frame for movement toward and away from the work without any side play, for insuring against damaging the cutter by jamming it against the work, and yet which will permit free swinging movement of the frame at all times.

Another object is to provide a cutting machine with means for feeding coolant outwardly over the cutter surfaces from a hollow cutter shaft, and to supply the coolant to the shaft in such manner as to not interfere with removal and replacement of the cutter on the shaft and also permit standard cutters to be used.

The invention also aims to provide novel guard assemblies for confining coolant and coolant spray to the region immediately adjacent the cutter; novel means for reclaiming the spent coolant and returning it to the cutter; means for returning coolant draining from work-pieces that may project beyond the machine; and a novel bearing assembly and coolant delivery shaft for supporting and driving the cutter and simultaneously delivering coolant thereto.

Further objects will become apparent as the specification proceeds in conjunction with the annexed drawings, and from the appended claims.

In the drawings:

Figure 1 is a perspective view, showing one form of machine of the invention mounted on supports;

Figure 2 is a partly sectional view, on an enlarged scale, of means for mounting the cutting element and shaft for rotation, showing one way of feeding a coolant to the cutter blade;

Figure 3 is a fragmentary sectional detail showing the pivot for the frame and the spring for adjusting the mechanism, to compensate for the varying weights of various drive motors, so as to maintain proper balance;

Figure 4 is a partly sectional side elevation, showing another means for mounting the cutter for rotation, together with another form of means for supplying the coolant, also forming part of the invention;

Figure 5 is a corresponding fragmentary front elevation of the flange of Figure 4 for supporting the cutter, showing the ports or passages for discharging the coolant over the surface of the blade;

Figure 6 is a fragmentary partly sectional side elevation of a modified type of coolant distributing device of the invention, in which coolant is supplied to both faces of the cutting element;

Figure 7 is a fragmentary partly sectional side elevation, on a further enlarged scale, of another modified form of cutter and mounting of the invention, wherein a cavity is provided in the end of the shaft, to receive coolant from a tube;

Figure 8 is a fragmentary side elevation, partly in section, of a further modified form of the invention, wherein the coolant is fed into the cutter shaft from the end remote from the cutter, and a modified form of guard is employed;

Figure 9 is a side elevation of the right-hand section of the guard shown in Figure 8;

Figure 10 is a vertical section taken on the line 10—10 of Figure 9;

Figure 11 is a horizontal section through the guard of Figure 8, taken on the plane indicated by the line 11—11 of Figure 9;

Figures 15 and 16 are fragmentary views of a saw blade to illustrate sharpening of the same;

Figure 17 is a diagrammatic illustration of an abrasive wheel cutting through a work-piece and employing a well known method of feeding coolant thereto; and Figure 18 is a view similar to Figure 17, but illustrates the disc supplied with coolant in accordance with the present invention.

In all the views, corresponding elements are indicated by similar reference characters.

Figure 12:
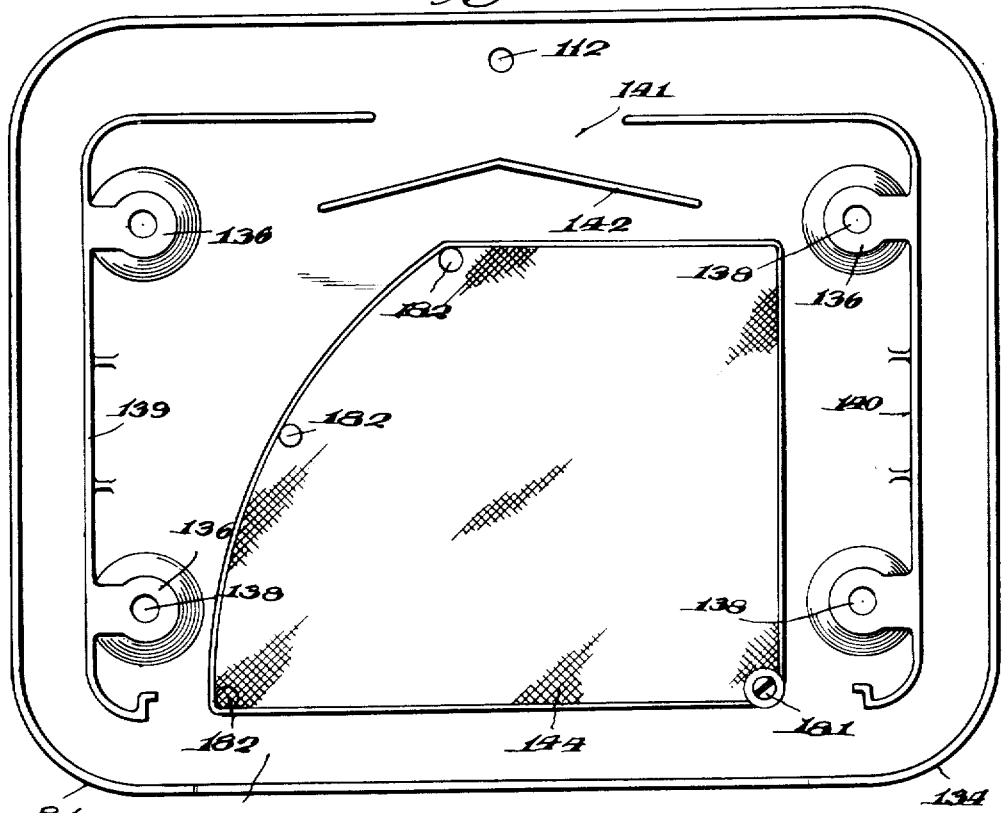
Figure 12 is a plan view of the pan for collecting spent coolant from the machines of either Figure 1 or Figure 8.

Referring first to Figure 1, the machine comprises a base 1, mounted on suitable supports or legs 2. A carriage or frame 3, mounted on a shaft 4 constituting a pivot, serves to support the cutting mechanism on a forwardly extending arm 3a, and also a motor 5. The latter supplies the power for the machine, and the shaft of which is connected by a suitable belt or belts to a shaft 6 (see Figure 2) which carries the cutting element 7, here shown as a metal cutting saw blade.

A protective casing 8 is provided and guards the cutter 7, which can move arcuately up and down therein, when the frame turns about shaft 4 as an axis. A second casing, or belt housing 9, surrounds the motor pulley and the pulley 10 driven thereby. While this is shown as a multiple-groove pulley, for use with a plurality of belts, this feature is not essential, and a single belt may be substituted if preferred.

Shaft 6 is mounted for rotation in a pair of ball bearings carried in a sleeve or journal portion 13 provided on the free end of arm 3a (Figure 2).

It will be noted that the guard 8 is shaped to cover the blade 7, only an arcuate slot or the like being left open to receive the driven shaft and permit it to move about the pivot 4 as an axis. A rod 11, preferably having a ball 12 at its end, is secured to the bearing sleeve 13 (Figure 2), so that a downward pull or push applied manually to the rod or ball will cause the cutter 7 to move downward.

Such downward motion of the saw may continue below the level of the top of the base 1 by reason of a circular insert 14 having a slot 15 extending in a diametral direction, and permanently aligned with the general plane of the cutting element 7. The insert preferably has its upper surface flush with the top of the base 1, so as to form a continuous plane therewith, thus providing a work-receiving table. A scale 16 may be provided on one of said parts to cooperate with index marks such as 17 on the other part, to indicate the direction of the slot 15 with respect to the base 1.

In order to make it possible to vary the angle at which the cutting is accomplished, the insert 14 is preferably mounted rotatably in the base 1, about a vertical axis in unison with frame 3, a clamping screw 18 being provided for securing the mechanism in its adjusted position. The screw 18 enters the arcuate slot 19 and below the same any suitable nut or the like may be threaded thereon, so that by tightening the screw 18 the parts may be clamped together firmly.

A fence 20, 21 here shown as of "angle-iron" configuration, is located on the table as illustrated, and may be adjusted forward and back and then clamped where wanted by any customary or conventional means. The fence is preferably made in the two sections 20 and 21 as shown, which are ordinarily maintained in alignment with one another and serve to guide the work-piece. Slots 22 and 23 may be provided in the table as shown for securing any desired auxiliary devices thereto, such as special guides or jigs for work-pieces of unusual shapes, or for supporting fences such as 20 and 21 in various positions.

Motor 5 and frame 3 are usually relatively heavy so that it would be difficult to cause them to pivot about the shaft 4 without counterbalancing means, and for this purpose a helical spring such as 24, best shown in Figure 3, may be provided. This spring may have one end 25 engaged in a suitable aperture 26 in a relatively stationary part 27 of the mechanism, its other end 28 being engaged in an aperture 29 formed in a collar 30 which is secured to the shaft 4 in any suitable way, for example by means of the set screw 31. The spring 24 is preferably adjusted to just balance the motor weight when in the position of Figure 1 and to rock the frame 3 from its cutting position in a counterclockwise direction slightly past the dead center position, to the position shown in Figure 1 so that only moderate force need be applied to handle 12 to feed the cutter into the work. This feature forms no part of the present invention and is more fully described and claimed in the above-mentioned copending application.

The novel means for mounting the frame for accurate swinging movement in the plane of the cutter or at right angles to the cutter axis, so that the cutter cannot be jammed in the cut, and yet which permits free rocking of the frame, will now be described.

Referring to Figure 3, frame 3 is provided with a pair of spaced ears, one of which has a threaded bore 32 and the other a plain smaller bore 33. The shaft 4 is mounted at one end directly in bore 33 and at the other in a sleeve 37, which snugly fits the shaft and in the frame. A threaded sleeve 34 is screwed into threads 32 and bears against collar or sleeve 37 and is operable to take up play in the bearings, as will be hereinafter described. Shaft 4 may be inserted in proper place by holding the base 3 in alignment with the relatively stationary portion 27 of the base and inserting the shaft 4 from the left-hand side, finally turning it to make the necessary adjustment. The shaft and sleeve 34 may then be secured to the frame by means of set screws 35 and 36 threaded into the ears of the frame, and which engage against a smooth undercut portion of the sleeve, and a reduced portion 38 of the shaft respectively.

By turning the shaft 4 a suitable amount in one direction or the other, which may be done easily by inserting a rod or lever in the hole 39, it is possible to secure the desired tension in the spring 24, to provide the desired amount of counterbalance, whereupon the set screw 36 may be tightened to maintain such adjusted condition.

The novel rigid yet free turning mount of the frame is provided by tapered "Timken" roller bearings 42 having their outer races 40 tightly fitting in bores in a pair of supports 27 rising from base 1. The cooperating inner races 41 are snugly but axially slidably carried by the shaft 4, and the rollers 42 are interposed between the races in the customary manner. All end play in these roller bearings is taken up before operating the machine by screwing sleeve 34 inwardly, which forces collar 37 against the inner race of the left-hand bearing, forcing it to the right and simultaneously pulling frame 3 to the left, which causes the right-hand ear to engage the inner face of the right-hand bearing, taking up all play therein. Screw 35 may then be tightened to maintain the bearing adjustment.

The roller bearings eliminate end play between the base 3 and the relatively stationary bracket 27. Even small end play here would be multiplied greatly at the cutting blade, causing binding of the blades when made of steel, and breakage if they are abrasive discs. This is a very important feature of the present machine, which makes it possible to take up all end play without affecting the ease of feeding the cutter into the stock being cut. The bearing assembly and sleeve 34 also make it easier to assemble the machine, because a slight clearance, say $\frac{1}{32}$ inch, may be left between the spaced ears on frame 3 and supports 27, and later taken up by screwing in the sleeve 34, toward the left-hand bearing 41, which in turn causes the other bearing 41 to bear against the bracket 3, thus taking up all play.

The arcuate guard casing 8 is centered about the axis of the shaft 4, so that the cutting blade 7 will move freely within such guard 8, thus shielding the operator as well as the cutter, and also preventing the cutter from throwing cuttings, grit or coolant centrifugally out of the machine.

Heretofore it has been difficult to provide satisfactory means for feeding the coolant to the cutter, because it has been found that the very considerable windage set up by an abrasive disc or a saw rotating at high speed forms an effective "barrier" at the sides of the wheel, which is sufficiently strong to repel streams of coolant directed against them. We have found that by feeding the coolant close to the axis in a region of negligible windage, remarkably good feeding of the coolant over the cutter, and new results are secured when it is applied to abrasive wheels and saws. One way of feeding the coolant in accordance with the invention is illustrated in Figure 4. Here it will be noted that the cutting blade 7 is mounted on shaft 6 by means of two cupped or undercut flanges 43 and 44, the latter functioning as coolant distributor. The flanges fit freely but without undue play upon the shaft. The shaft 6 may have an integral flange 45 thereon, against which abuts the central portion of the flange 44, as shown, the flange 43 being clamped against the other side of cutter 7 by means of the nut 46 engaged on the threaded end 47 of the shaft.

By reason of the undercut or cupped construction of flanges 43 and 44 the disc 7 is not stressed at its center and is merely clamped annularly between the flanges, so that no breaking stresses are produced when the nut 46 is tightened. The undercut portion of the flange 44 also serves a further purpose, namely, it acts to feed the coolant. The rim of the flange 44 is provided with any desired number of substantially radial grooves 48, so that instead of having a continuous close and tight contact with the cutter element 7, radial discharge ports or passages are provided at intervals, to permit the liquid to pass outwardly over the blade in response to centrifugal force.

To feed the coolant into the space 49 in the distributor a chamfered inwardly directed annular groove 50 is provided in the opposite face of the flange or washer 44, the inclined surface of the groove being arranged so that gravity and centrifugal force will combine to maintain the liquid in an annular body at the outside or bottom of the groove, whence it may pass into the space 49 through a plurality of suitable apertures 51 extending through the flange.

In order to supply the coolant, a suitable container 52 may be mounted upon the housing 13, with a shut-off valve 53 and an adjusting collar 54 having a locking means 55, such as is often used in sight-feed lubricators. A suitable peep hole 56 will reveal the rate of drip of the liquid, in the customary way. Fttings 57, 58 and 59 support the container 52 on the housing 13, and also hold the discharge tube 60 projecting into groove 50 but out of engagement with flange 44, in proper position to feed the coolant into the groove 50.

The arrows 61 indicate diagrammatically the flow of the coolant, which here passes entirely on one side of the tool 7 and impinges on the work-piece 62 mounted on the table formed by the upper surface of the base 1. While the flow takes place along only one face of the cutter, it has been found that when saw 7 is used, upon reaching the saw periphery part of the coolant crosses over between the teeth so that coolant is constantly being thrown off the tooth tips throughout 360 degrees of rotation and extracts heat from the cutting edges more rapidly than has heretofore been possible. Some of the coolant will enter the kerf made in the work by the cutting disc or the like, so as to wet and cool the teeth while cutting.

When using abrasive wheels, or when heavy sawing work is encountered we preferably employ the modified construction illustrated in Figure 6. Here the cutter 63 (shown as a saw blade) has a much larger central opening indicated at 64, and is mounted between a flange 43, identical with that of Figure 4, except that it has a plurality of discharge ports 48, and a companion flange 65, which differs materially from flange 44 of the previously described form. The shaft 6, nut 46, shoulder 45 and bearing sleeve 13 are shown as being the same as those of Figure 4.

The flange 65 has a central portion 66 of proper diameter to fit within the opening 64 of the cutter 63 as shown, to center and support it in proper position. An undercut groove 50 is provided in the flange 65 to receive the end of the coolant-feeding tube 60, which leads to the reservoir 52 of Figure 4, not shown in the present figure. Passages 67 and 68 are provided in flange 65 to provide communication respectively with the space 69 and the space 70 on opposite sides of the cutting tool 63, and passages 48 and 71 lead radially outward from these spaces to permit the outflow of coolant adjacent both faces of the cutter, as indicated by the arrows.

This form of device therefore will wet and cool both sides of the tool and of the cut, and thus provide superior service, especially in cases where it is difficult to secure a flow of coolant between the tool and the work-piece.

The further modified form illustrated in Figures 2 and 7 also delivers coolant over both sides of the cutter, and possesses the further advantage of making it possible to utilize standard size saws and abrasive wheels, having a small opening fitting directly over shaft 6. In this form of the invention the coolant flows through a tube 72 which is bent as shown at 73, so that its end may enter into a cavity or bore 74, in the end of the driven shaft 6, it being understood that guard 8 will have a slot to accommodate tube 72. The cutter 7, which is here a saw of standard size, is mounted on the shaft 6 between flanges 75, each of which has radially arranged passages (not shown) preferably identical with radial ports 48 of the flange 43 of Figure 6 so that liquid may thus be discharged along both faces of the saw 7.

A plurality of apertures 76 and 77 in shaft 6 communicating with the bore 74 establish communication between it and the spaces 78 and 79 on opposite sides of the saw 7, from which it passes under the action of centrifugal force through ports 48 in the flanges to both faces of the saw as before. In this form of the invention it is clear that centrifugal force and gravitation will cooperate to cause the coolant to flow radially outward along both faces of the saw or abrasive wheel cooling the same, as well as wetting and cooling both the cutter and the work-piece at both sides of the cut, in the same manner as the device of Figure 6, and yet permitting the use of standard dimensional saws and abrasive wheels.

While the exact nature of the coolant is immaterial to the present invention, coolants are liquids consisting at least in part of water, usually carrying other substances of the nature of inorganic chemicals in solution, and sometimes also containing oily substances emulsified or "dissolved" therein. The main function of the coolant when a saw is used is to carry away the heat developed at the point where the work-piece is being cut, and to constantly extract heat from the tips of the teeth throughout 360 degrees of rotation as it is centrifugally thrown off the teeth. One form of coolant that has been successfully used is marketed by the Standard Oil Company, under the trade name "Superla," mixed with one-half water. By supplying a copious flow of coolant of high heat absorbing power to the cutting location in accordance with the invention makes it possible for the saw to operate at a lower temperature than heretofore possible and turn out more work.

When the coolant distributing means of the invention is applied to an abrasive wheel it cools both sides and the edges of the cutting surface and also performs the further highly desirable function of constantly subjecting the sides to a scrubbing action, which removes slime or other particles and keeps the pores of the wheel clean.

By applying either end of the novel coolant feeding assemblies just described to a circular saw, and employing the foregoing antifriction bearing mount for the saw carrying frame, so as to preclude jamming the saw in the kerf, and using a comparatively thin steel saw blade, of sufficient hardness to avoid rapid dulling of the teeth, and yet sufficiently ductile and tough to withstand the stresses of sawing without cracking, and sufficiently soft to permit sharpening of the teeth by a hand filing operation, and designing teeth of special form and having gullets sufficiently large to receive the whole chip of the material removed during each cut, and rotating the saw to develop cutting speeds of from approximately five to fifteen thousand feet per minute, it is possible to produce burr-free work materially faster and yet with greater accuracy than heretofore feasible, without overheating the saw or the work, and without requiring re-sharpening of the saw until after a great volume of work has been turned out.

The revolutionary nature of the results achieved by the invention, namely, the rapid, burr-free, cool and accurate cutting of non-ferrous metals and other materials may best be illustrated by an example of an actual installation of four of the machines of the invention at Fort Wayne, Indiana, set up for the mass production of rings of non-ferrous metal. These rings were 20 mm. in diameter, about $\frac{3}{32}$" wall thickness and had to be $\frac{1}{16}$" thick within .003" and be square. They were using an 8" diameter .045" thick, 144 tooth blade, ground and sharpened in accordance with the invention, and using the novel coolant means. One of these machines was producing 15,000 pieces per 8 hour shift and the blade was sharpened each 10,000 pieces. This production was materially greater than could be obtained on a screw machine, and the saving in material was much greater since the saw was only .045" thick and the parting tool in a screw machine would have to be at least ⅛" to stand up. The quality of cut and accuracy was also better with the low priced equipment of the invention. It should be considered, too, that with a screw machine it would have been impossible to obtain such high cutting speeds, since here the long 10' bar must be revolved and the parting tool is stationary. To cut 200' for one minute it would be necessary to turn the bar about 300 R. P. M. With our machine running at 4000 R. P. M., a cutting speed of over 8000' per minute was obtained, about forty times faster.

We have found that a saw steel heretofore used only in wood saws and known as specification T-11, having a hardness of 52 to 54, Rockwell C scale, from .045" to $\frac{3}{32}$" thick gives very good and is apt to break or crack if it should become jammed and also cannot be sharpened by filing in accordance with the invention.

The form of tooth is also important. We have found that by employing a clearance angle of approximately 12 degrees and a hook angle of from approximately 12 to 15 degrees very good results are secured with the general classes of work encountered in practice; however for different kinds of work and material slightly different angles may be used, if found desirable. It is also important to make the gullets sufficiently deep to carry the whole chip, because they act as chip breakers to properly curl the chip during the cut, and should also have a radius of curvature which bears a predetermined relationship to the size of gullet. If the gullets are too small, the material fuses into the gullet and gives trouble, particularly when cutting aluminum.

To secure the best possible results it is also important to hollow-grind the saws, so that they are appreciably thinner adjacent the center than at the periphery, thereby providing proper clearance in the cut to avoid binding and heating. This also improves the smoothness of the severed ends of the work.

We have also found that for general purposes, and for sawing large sections of brass and aluminum a 10" saw $\frac{3}{32}$" thick, and having 80 teeth gives very satisfactory results, while 8" saws having 100 and 144 teeth and $\frac{1}{16}$" and .045" thick respectively are useful for lighter duty work, although the 144 tooth saw has also been very useful in cutting heavy sections of easy cutting stock.

In general speeds of approximately 2000 R. P. M. are satisfactory for the 10" blade, but 4000 R. P. M. can be used on large diameter thin sections. For 8" blades 4000 R. P. M. is general, but the speed found best will be determined by the size and hardness of the material to be cut. We have found that speeds up to 15,000 feet per minute can be successfully used if the arbor is rigidly supported.

The specifications of three saws made in accordance with the invention which have been found to give excellent results in the field are given by way of example in the following table, it being understood that the invention is not limited to the exact details disclosed.

*Examples of saws of the invention*

|  | Saw | | |
| --- | --- | --- | --- |
|  | I | II | III |
| Character of work | General purposes and large sections of brass and aluminum. | Lighter duty non-ferrous work. | Light wall tubing; "gliders" metal—light and heavy sections. |
| Diameter | 10" | 8" | 8". |
| Teeth | 80 | 100 | 144. |
| Thickness [1] | $\frac{3}{32}$" | $\frac{1}{16}$" ($\frac{1}{16}$ min. for 10" and 12" blades) | .045". |
| R. P. M. | 2,000 / 4,000 [2] | 4,000 | 4,000. |
| F. P. M. | 5,250 / 15,000 [2] | 8,000 | 8,000. |
| Hardness | 52RC-54RC | 52RC-54RC | 52RC-54RC. |
| Clearance angle | 12° | 12° | 12°. |
| Hook angle | 12° | 15° | 15°. |
| Gullet radius | $\frac{1}{16}$" | $\frac{3}{64}$" | $\frac{1}{32}$". |
| Gullet depth | $\frac{7}{32}$" | ¼" | $\frac{3}{64}$". |
| Land | ⅛" | $\frac{1}{32}$" | .022" (approx.). |

[1] All saws are hollow ground so as to uniformly increase in thickness outwardly to the tabulated thicknesses at the periphery.
[2] Higher speed is used on large diameter thin sections.

results. If the saw is softer than this it will not keep its cutting edge, while if it is much harder, say 60–62 RC, it is too brittle for rough service We have also discovered that it greatly improves the performance of the saw to sharpen the teeth by a special method, including the step of filing perpendicularly to the plane of the blade across the "clearance" face to develop the final cutting edge. This results in a continuous edge, that is sharp and will cut without excessive heat. It is unbroken by any burrs such as usually result from grinding teeth with a cup wheel, and the latter even if removed would result in a ragged cutting edge, which would soon break down. By filing the teeth in accordance with the invention, any burr that develops occurs at the sides of the teeth and is sharp and it has been found highly advantageous to leave any such burr on the tooth and make no attempt to remove it, as it improves the cutting of the saw.

The complete method of sharpening the saw blade is as follows:

Referring to Figures 15 and 16, each figure shows two teeth, with the gullet between them. The first step in sharpening a partly dulled saw is to joint or round the blade, that is, to make all the teeth of exactly the correct height, so that their tips are all on a circle concentric with the axis of the cutter spindle, whereby it is assured that all the teeth will share equally in the cutting work, and none will be too high or too low to do so. The jointing is best done by leaving the cutter blade on its spindle, and bringing it into contact with an abrasive surface, such as a piece of broken emery wheel or a jointer stone made for the purpose. This preferably is held firmly against the fence and located below the cutter blade. The rotating blade is firmly held against the abrasive until the teeth are ground to uniform radius, and each tooth then has a burr and a narrow land thereon, the land being only 2 to 5 thousandths of an inch in width. Of course no more than necessary should be ground off in this operation.

Figure 15 shows the jointing operation completed. The gullet 145 is here shown with a "hook" angle of 12°, that is, the front of the tooth is at a slope of 12° to the radius from the point of the tooth. The outer surface 146 of the tooth preferably is also at about an angle of from 12 to 15° to the circle 147 defining the outer diameter of the blade, so as to provide a clearance of this amount, as shown. The land produced by the jointing lies along this circle, and a burr 148 appears in front of it. This burr 148 as well as the land must then be removed.

The second and final step in sharpening the blade is to remove and support the blade in a suitable fixture and file across the plane of the blade, the file 149 being held in the direction of the tooth surface 146, so as to maintain the 12° angle, as shown in Figure 16. This filing should be done carefully, keeping the file perpendicular to the plane of the blade, and at the proper angle, and the filing must stop as soon as the burr 148 has been removed and the land cut away, so as to bring the tooth to a sharp point, lying on the circle 147. The teeth should be left as they are when the filing has been accomplished, and no attempt should be made to hone or wire brush any part of the teeth after the filing, as this will only destroy the sharp edges, and dull the saw blade. When in the course of time the teeth become too short because of many sharpenings, the gullets 145 may be recut by a gumming wheel, as is customary in circular saws.

Referring now to the form of the invention shown in Figures 8, 9 and 10 the outstanding difference between it and the Figure 7 form is that in Figure 7 the coolant is introduced into the tool carrying shaft from the left hand side, whereas in Figure 8 it comes from the right. This makes it possible to have the left side entirely unobstructed for ready replacement of the saw or abrasive wheel, while at the same time a plentiful flow of coolant may be employed, which is very desirable in cutting on a production scale. The Figure 8 form therefore will be preferred for high volume production. The means employed for catching and reclaiming the spent coolant, whereby it may be used again and again, has been illustrated as applied to both the machines of Figures 1 and 8, and will be described hereinafter.

In high quantity production work it is also desirable to use a modified form of cutter guard, to enclose the tool more completely and effectively than the guard of Figure 1, because the increased flow of liquid would otherwise cause a fine mist or spray of coolant to escape from the machine, and make the machine and its surroundings wet and disagreeable, aside from impinging on the operator himself, and such a guard is shown in Figures 8, 9 and 10.

In Figure 8 there is shown the base 1 of the machine, upon which is mounted the modified guard 80 for the cutter, which will be described later. The bearing sleeve or journal 83 is carried by arm 3a of the frame as before but embodies a modified ball bearing assembly for the cutter shaft 98, which is here tubular throughout its length, and of uniform outer diameter, but has two bores of different diameter, the bore 99 being smaller than the bore 100, the latter being at the cutter end of the shaft. A double-row bearing 102 is employed at the cutter end, where the greatest stress occurs, while a single-row ball bearing 101 is used at the other, which is usually sufficient at the pulley end of the shaft.

The outer race of bearing 102 is clamped between a shoulder inside member 83 and a closure 103 secured to the end of member 83 by means of screws or the like. The inner race of bearing 102 is gripped between a shoulder and a nut 102a threaded on shaft 98. Bearing 102 therefore takes all end thrust of the shaft and precludes endwise movement. Closure 103 is also preferably provided with a portion 103a projecting into a flange on shaft 98 and cooperating therewith to provide a seal to exclude dust and coolant from the bearing.

Bearing 101 is mounted for endwise floating movement in member 83 and takes on radial loads, a closure plate 101a being provided between the inner race of the bearing and the pulley and snugly fitting within member 83 to exclude dust and coolant.

The coolant is fed into the shaft by means of a rod 85 mounted slidably in bore 109 formed in the lug 110 extending from a collar 82, secured to sleeve 83 in any desired way. A thumb-screw 86 is provided to hold the rod in position when adjusted. One end of rod 85 is threaded to fit into the pipe T 87 as shown, and closes the corresponding arm of the T liquid-tight. A fitting 90 is screwed into the opposite arm of the T, and is in communication with a flexible tube 91, which leads to the discharge end of a coolant pump 111, which may be of any preferred type, and advantageously is mounted beneath a coolant collecting tray 81, with which it communicates through the hole 112, to receive the coolant directly, by gravity flow, thus simplifying the machine and avoiding the need of piping or the like. If a screen is not built into the pump 111, a separate screen or other filtering device 150 may be interposed between the outlet 112 of the tray and the intake of the pump, to remove solids from the spent coolant before recirculating the latter. The pump may be driven in any preferred way, as by a small motor 113 mounted adjacent thereto, and indicated diagrammatically in Figure 14.

From the upper end of the flexible tube 91, the coolant enters the T 87, whence it flows to the stopcock 92, having the operating handle 93, thence through the fitting 94 to the tube 95, preferably made of copper or other sufficiently flexible metal to permit bending as shown at 96, to direct the free end of the tube partly into the bore 99 of the shaft 98, and out of contact therewith. Thus the tube 95 can feed coolant into the shaft, without causing any friction or wear of either the tube or the shaft.

Pulley 10 is secured to the shaft 98, by a key such as 104, and a tubular nut 97, screwed onto threads 105 provided at the end of the shaft 98, with a washer 107 between it and the pulley, and serving as a locking means to prevent loosening of the nut 97 when bent over one of the flats of the nut as shown at 108, the washer itself being kept from turning by a projection thereon extending into the keyway 114 of the shaft.

It is to be understood that the coolant feeding and distributing means associated with the cutter in the device of Figure 8 is the same as that of Figure 7, embodying openings 76 and 77 adjacent the distributor collars 75, which feed the coolant to both sides of the saw or abrasive wheel. This form of the invention accordingly makes it possible to use standard sized saw and abrasive wheels and to install them in the usual rapid manner without necessity of disturbing the coolant supply means in any way.

The guard 80 shown in Figure 9 will now be described in detail. It differs from the guard 8 of Figure 1 in certain particulars which adapt it to use with a relatively large flow of coolant, as distinguished from the small feed provided by the reservoir 52 of Figure 4 for example. The main difficulty that would be encountered upon using the guard 8 would be that liquid would be scattered by the wheel both in spray and in the form of a fine mist, due to the centrifugal force of the rapidly rotating wheel acting on the large feed of coolant.

The guard 80 is provided with an additional protector in the form of a deflector rib 115 around the top and front of the opening 116 for the spindle that carries the cutter, the rib or bead being of maximum height at the front, that is, toward the operator, as shown at 119, this portion extending from the bottom edge 120 to the vertical line as at 121, and then tapering in height to the horizontal line 122, where it blends with the general level of the remainder of the face 123 of the guard. In other words, the bead or raised portion is of maximum, uniform height in front and up to the top of the opening 116, then in a quarter turn to the rear decreases gradually in height until it blends into the face 123, as shown in Figures 9, 10 and 11.

On the opposite side of the guard is a groove or the like, as shown at 124 in Figures 9, 10 and 11, to receive a removable cover 125, held in place by the heads of screws 127 in tapped holes 128 in the guard, one of the screws being shown in Figure 9. The guard 80 is preferably secured to the work table by screws entering into the tapped holes 129 and 130 from below, to hold the flat surfaces 131 and 132 against the top of the insert or turntable 14. These surfaces are offset to one side of the guard, as best shown in Figure 10, so as to clear the cutter. The lower rear portion of the guard is enlarged as shown at 133, to aid in causing the liquid thrown from the cutter to flow off below the table, and as illustrated is widened or offset to the right.

This form of guard also embodies an auxiliary guard 154 pivoted to guard 80 on a screw 155 and having a flange 156 adapted to overlie flange 115 of guard 80 and form a labyrinth passage through which only a negligible amount of spray and mist can escape. The lower edge 157 of guard 154 freely rests upon sleeve portion 13 or 83 of the frame, so that the guard will follow the cutter in its up and down movements and maintain the upper end of slot 116 closed at all times.

The guard of Figures 8, 9 and 10 also embodies a removable front section or insert 159, secured to the guard by lugs 161 and 162 and a cap screw 163. The insert is secured to the table insert by means of a lug 164 and a cap screw 165. By removing the insert it is possible to feed work into cutting position directly from the front of the machine, and this is extremely convenient when long pieces of work are being handled as it makes it unnecessary to feed the work endwise through the side openings in the guard. It is to be understood that in this form of guard the rear support will adequately support the guard during any cutting operation with the guard insert removed.

Figure 13:
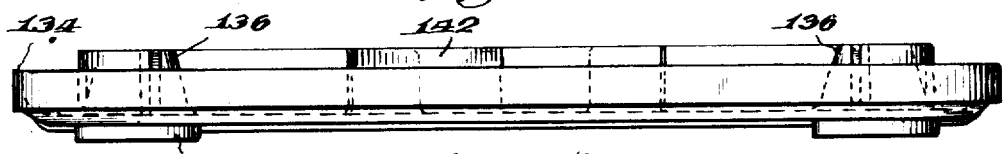
Figure 13 is a front elevation of the pan of Figure 12.
Figure 14:
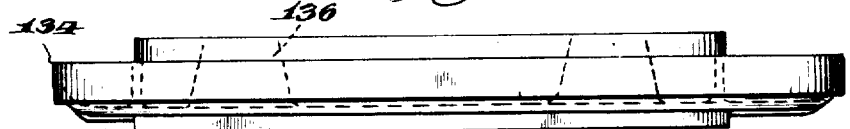
Figure 14 is a corresponding end elevation.

The pan 81 for collecting the spent coolant and other waste is shown in detail in Figures 12, 13 and 14, and its position in the machine is indicated in Figures 1 and 8. It is located immediately beneath the base 1, and immediately on top of the legs 2, when such are used. It will be understood, of course, that while legs are a great convenience in a machine of this type, they are not essential, and in certain installations the machine may be mounted on a workbench or the like, in which case the pan 81 would rest directly on the bench, which would be cut to allow the pump to extend therethrough, if necessary. Such installations would be made by the user himself, hence are not illustrated, and are mentioned here merely to show that the legs 2 are not essential.

The pan 81 has an upstanding rim 134 and a substantially flat bottom 135. Lugs 136 rise from this bottom and other lugs 137, in alignment therewith, extend down from the lower surface of said bottom 135, each lug having a hole 138 therethrough, to receive the bolts or other fastenings for holding the machine to its legs or equivalent support. The lugs 136 are preferably taller than the rim of flange 134, and thus raise the base 1 definitely above the highest possible level of liquid in the pan 81. Other ribs or flanges 139 and 140 rise from the upper surface of the bottom 135, preferably to the same height as the lugs 136, so as to adjoin the bottom of the base 1, and close the openings at the sides thereof. The ribs 139 and 140 leave openings at the front and back however, as seen best in Figure 12. The front opening 143 thus provided affords access to the pan for cleaning, and the pan may also be provided with a removable panel, further confining spray to the pan 134 and within the base 1, Figure 1.

The rear opening 141 gives an outlet to the drain opening 112, guarded however by the V-shaped baffle 142, so that the liquid may drain into the pump 111 through said opening, while the baffle will retard or stop the mist or spray caused by the coolant striking the bottom of the pan.

While the pump is preferably carried directly by the pan, as shown diagrammatically, this is merely a matter of convenience, which provides a very compact and trouble-proof installation, and minimizes the piping required. If for any reason the pump is to be located otherwise, this obviously may be done by means of suitable pipes or other connections, as preferred by the user. If very small parts are being cut by the machine, a screen or pallet 144 may be pivoted on a boss 181 provided on the bottom of the pan and supported on a series of bosses 182. The screen is operable to catch such work-pieces as may fall through the turntable 14, and prevents them from passing into the drain opening 112. These work-pieces may then be recovered by pulling out the screen from time to time as necessary. The outer portion of the pan, shown extending out beyond the base 1 in Figure 1, will catch any liquid that spreads and flows over the sides of the base, and will return it to the pump through the drain opening 112.

In Figure 1 we have also disclosed novel coolant return assemblies which are particularly advantageous when long pipes or other hollow workpieces are cut. Since both devices are identical in form, only one will be described in detail. Supported on a stand 151, which may be adjustable as to height, is a trough 152, which extends under the work-piece and inclines downwardly toward the lip of tray 81, for returning coolant thereto. Accordingly, if coolant travels along the inside or outside of the pipe it will drain into trough 152 and feed back to the tray, where it is reclaimed with the remainder of the coolant, and returned to the cutter. If desired, the length and inclination of the trough may be adjusted to suit the particular work at hand.

The operation of the invention will be clear from the above description of the structures involved, but may be summarized briefly as follows:

Assuming that it is desired to cut a workpiece in accordance with the high speed wet cutting method of the invention, and one of the novel saws is in place on the arbor 6 or 98, the saw is brought up to speed and the coolant feeding device started.

The work-piece is placed on the table under the saw and handle 12 pulled down, to feed the saw into the work. The liquid coolant will then flow along one or both faces of the cutting blade, under the action of centrifugal force, which will cause it to enter forcibly into the kerf in the work-piece, as well as be discharged throughout 360° of rotation past the tips of the teeth, so as to constantly extract heat therefrom irrespective of whether they are cutting. The rate of cut is controlled by the speed with which the lever 11 is brought down manually, and the proper rate of feed will be readily determined by practice. The spring 24, which has preferably been adjusted to overbalance the mechanism slightly, will serve to retract the cutting blade from the work-piece when pressure on the lever 11 is relaxed.

By adjusting the mechanism about a vertical axis passing through the center of the insert 14 (after loosening screw 18), the angle between the cutter and the work-piece may be adjusted as desired, and by shifting the fence members 20 and 21 into various adjusted positions, different work-pieces may be accommodated readily.

All the mechanism turns about the axis of insert 14, in such a way that when the mitre angle is adjusted the alignment of the various parts is not disturbed. The coolant reservoir as well as the guard 8 for the cutting blade in Figure 4 all move together as a unit, thus materially simplifying the structure and ease of operation and adjustment of the machine.

In the coolant feeding assembly of Figure 8, the jet or stream of coolant entering shaft 98 from tube 95 is initially directed to the left, and this, in combination with the fact that bore 100 is larger than bar 99, effects a definite flow of coolant into openings 76 and 77 in the shaft 98 for delivery to the coolant distributors 75.

In order to facilitate cutting a number of pieces of the same length, when desired, an adjustable fence stop may be provided, as shown at 89, the fences 20 and 21 being provided with holes 84 through any one of which the stop will fit. The stop preferably is a screw having a hexagonal head, to facilitate holding it by a wrench. The details of this stop are disclosed and claimed in the aforementioned application Serial No. 403,048.

The belt guard shown in Figure 1 has an outer portion 9 which is substantially a box open to the left, and a cover 126 for said box. This cover fits loosely within the box 9, and engages three pads or lugs therein, which retain it properly spaced from the belt and pulleys. A single stud bolt passing through both sides of the guard, threaded into arm 3a of the frame, holds these parts together, so that thus only a single nut need be taken off to permit access to the belts and pulleys, by removing the portion 9 of the guard.

In Figures 17 and 18 we have diagrammatically illustrated the different cutting actions which are secured when using the prior coolant distributors with an abrasive wheel and the coolant distributing means of the invention, respectively.

Referring to Figure 17, the abrasive wheel 171 is shown as cutting through a piece of stock 172, the coolant being supplied through a pipe 173 directed toward the periphery of the wheel. This results in the wheel being cooled in the center of the section and burring-off of the outside edges 174, leaving a rounded or convex edge, and producing a burr on the work indicated at 175.

When employing the coolant distributing means of the present invention, as disclosed in Figure 18, the abrasive wheel 177 is clamped between two flanged distributing collars 178, and coolant is fed over both sides of the disc, as indicated by the arrows 179, in accordance with either of the methods disclosed in Figures 6, 7 and 8. By reason of the coolant flowing outwardly over both sides of the disc, the edges of the wheel are efficiently cooled and this maintains a sharp corner at each edge of the cutting surface. Since no coolant reaches the center of the section, or the middle of the cutting surface, this part of the wheel wears away, producing a concave face which cuts off the work 180 without burrs at either edge and which has heretofore been impossible to accomplish.

From the foregoing detailed disclosure it is apparent that the invention provides novel cutting methods and apparatus which make it possible to turn out burr-free work more rapidly and accurately than heretofore feasible, and also provides novel coolant supplying and distributing apparatus which may be applied to either saws or abrasive wheels, and in which the heavy flow of coolant makes it possible to cut at very high speeds, as both the cutter and the work-piece are kept cool enough to prevent damage to either, such as dulling of the cutter or discoloration of the work-piece. The heavy flow of coolant also prevents any warping of the cutter, especially when coolant is fed to both faces of the cutter, as both sides are then kept equal in temperature. This in turn aids in making a true cut of the work-piece, as there is no tendency of the cutter to cut differently on one side and the other. When the coolant system is used with abrasive wheels the constant flow of closely adhering streams or films of coolant effectively wash away any dust or slime, keeping the wheel clean and in efficient cutting condition at all times. An incidental advantage when using abrasive cutters bonded with rubber, is that when coolant is used there is not as much disagreeable odor of burnt rubber, which becomes serious in a shop having a number of such machines in operation. A further advantage is the elimination of particles of abrasive dust from the surrounding atmosphere, injurious both to the operator and to adjacent machines.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a cutting machine, a drive shaft, a cutter disk and coolant distributing assembly fixed to said shaft for unitary rotation therewith, said assembly including a distributing member having an outer rim flange on one side contacting a side face of the cutter disk to provide a coolant receiving pocket inwardly of said flange and formed with radial discharge ports, said member at its opposite side having an annular coolant receiving trough and a series of ports delivering the coolant from said trough into said pocket for distribution through said discharge ports over said side face of the cutter disk.

2. The cutting machine defined in claim 1 wherein said discharge ports open on the disk contacting face of said rim flange to distribute the coolant under centrifugal force in a direction substantially normal to the axis of rotation and in a substantially continuous film over the surface of the cutter disk.

3. The cutting machine defined in claim 1 in which said distributing member is further provided with an additional series of ports directly delivering coolant from said trough to the other side face of the cutter disk.

CHRISTY A. WIKEN.
HUGO V. BOEHNKE.

Certificate of Correction

Patent No. 2,413,016.  December 24, 1946.

CHRISTY A. WIKEN ET AL.

It is hereby certified that errors appear in the printed specification of the above numbered patent requiring correction as follows: Column 6, line 21, for "face" read *race*; column 7, line 29, for "Fttings" read *Fittings*; and that the said Letters Patent should be read with these corrections therein that the same may conform to the record of the case in the Patent Office.

Signed and sealed this 11th day of March, A. D. 1947.

[SEAL]

LESLIE FRAZER,
*First Assistant Commissioner of Patents.* kept cool enough to prevent damage to either, such as dulling of the cutter or discoloration of the work-piece. The heavy flow of coolant also prevents any warping of the cutter, especially when coolant is fed to both faces of the cutter, as both sides are then kept equal in temperature. This in turn aids in making a true cut of the work-piece, as there is no tendency of the cutter to cut differently on one side and the other. When the coolant system is used with abrasive wheels the constant flow of closely adhering streams or films of coolant effectively wash away any dust or slime, keeping the wheel clean and in efficient cutting condition at all times. An incidental advantage when using abrasive cutters bonded with rubber, is that when coolant is used there is not as much disagreeable odor of burnt rubber, which becomes serious in a shop having a number of such machines in operation. A further advantage is the elimination of particles of abrasive dust from the surrounding atmosphere, injurious both to the operator and to adjacent machines.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a cutting machine, a drive shaft, a cutter disk and coolant distributing assembly fixed to said shaft for unitary rotation therewith, said assembly including a distributing member having an outer rim flange on one side contacting a side face of the cutter disk to provide a coolant receiving pocket inwardly of said flange and formed with radial discharge ports, said member at its opposite side having an annular coolant receiving trough and a series of ports delivering the coolant from said trough into said pocket for distribution through said discharge ports over said side face of the cutter disk.

2. The cutting machine defined in claim 1 wherein said discharge ports open on the disk contacting face of said rim flange to distribute the coolant under centrifugal force in a direction substantially normal to the axis of rotation and in a substantially continuous film over the surface of the cutter disk.

3. The cutting machine defined in claim 1 in which said distributing member is further provided with an additional series of ports directly delivering coolant from said trough to the other side face of the cutter disk.

CHRISTY A. WIKEN.
HUGO V. BOEHNKE.

---

Certificate of Correction

Patent No. 2,413,016.  December 24, 1946.

CHRISTY A. WIKEN ET AL.

It is hereby certified that errors appear in the printed specification of the above numbered patent requiring correction as follows: Column 6, line 21, for "face" read *race*; column 7, line 29, for "Fttings" read *Fittings*; and that the said Letters Patent should be read with these corrections therein that the same may conform to the record of the case in the Patent Office.

Signed and sealed this 11th day of March, A. D. 1947.

[SEAL]

LESLIE FRAZER,
*First Assistant Commissioner of Patents.*